Figure 1:
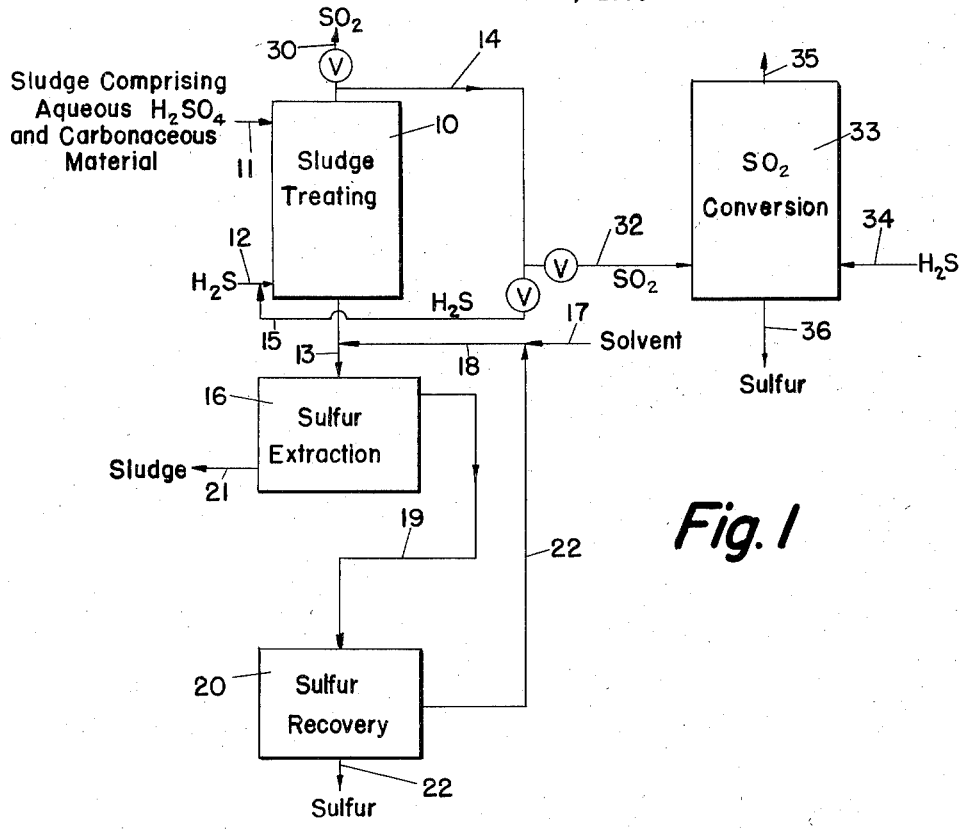

INVENTOR.
PETER B. MURRAY

2,839,365

TREATMENT OF SULFURIC ACID SLUDGE

Peter B. Murray, Swarthmore, Pa., assignor to Sun Oil Company, Philadelphia, Pa., a corporation of New Jersey Application June 25, 1956, Serial No. 593,587

6 Claims. (Cl. 23—178)

This invention relates to the treatment of sulfuric acid sludge produced in petroleum refinery operations involving contact of hydrocarbons wtih sulfuric acid.

Sulfuric acid sludge produced in petroleum refinery operations presents a difficult problem with regard to waste disposal, and it is desirable to provide satisfactory ways of obtaining valuable materials from the sludge, rather than discharging the sludge. Hydrogen sulfide produced in various refinery operations also presents a disposal problem, and it is desirable to provide satisfactory ways of converting hydrogen sulfide into elemental sulfur or more valuable sulfur compounds.

According to the invention, the above desirable features are accomplished by contacting hydrogen sulfide and sulfuric acid sludge under conditions as subsequently specified including the use of temperatures not exceeding 250° F. It has been found that the sulfur in both the hydrogen sulfide and the sulfuric acid sludge can be converted in such manner into elemental sulfur, or into elemental sulfur and sulfur dioxide.

The invention is particularly advantageous as applied to sulfuric acid alkylation sludge, produced in processes involving hydrocarbon alkylation employing sulfuric acid as alkylation catalyst. Various alkylation processes are well known in the art, for alkylating compounds such as isobutane or isopentane with olefinic hydrocarbons such as propylene, butylene, amylenes, etc. Customary practice involves the use of sulfuric acid having initial concentration of about 99%, the operation being continued until the concentration of the sulfuric acid has decreased substantially, for example to a concentration within the approximate range from 85 to 90 percent. Typical compositions of the used alkylation sludge at this point include a total carbon content of 5 to 8%, the sludge comprising mainly $H_2SO_4$ and hydrocarbon sulfonates.

In the prior art, alkylation sludge has been decomposed in the presence of coke, at a temperature for example of about 1800° F., in order to convert sulfuric acid to sulfur dioxide and hydrocarbons to coke. The process of the present invention is advantageous in providing conversion of sulfuric acid into sulfur, or into sulfur and sulfur dioxide, while avoiding the high temperatures and coke-handling problem of prior art operation.

The temperature of the contacting according to the invention is within the approximate range from 40° F. to 250° F., and preferably within the approximate range from 70° F. to 150° F. Excessively high temperatures should not be employed, since they result in charring. Catalysts for decomposition of $H_2SO_4$ to $SO_2$, e. g. mercuric sulfate, can be employed if desired.

The highest temperature at which the process according to the invention can be carried out without excessive charring of the sludge increases with decreasing concentration of $H_2SO_4$ in the sludge. Thus, it is possible, in operation where the $H_2SO_4$ concentration declines to below 75% for example, to increase the temperature correspondingly in order to increase the rate of conversion of $H_2SO_4$. Preferably, the temperatures will at all times be within the approximate range from 40° F. to 250° F., though in some instances it is possible to use temperatures above 250° F., and up to 400° F. for example, when the $H_2SO_4$ concentration has declined to a suitably low level.

The process according to the invention is preferably carried out at a pressure of about 1 to 30 atmospheres. Elevated pressures favor conversion of $H_2SO_4$, but satisfactory results can be obtained at ordinary atmospheric pressure.

Elemental sulfur is formed in the process according to the invention by decomposition of $H_2SO_4$, and the reaction mixture is preferably continuously agitated in order to keep the elemental sulfur which is formed suspended in the reaction mixture. Elemental sulfur can be recovered from the reaction mixture, upon completion of the process, in any suitable manner, for example by extraction with a suitable solvent such as an aromatic hydrocarbon.

At suitable rates of contacting of $H_2S$ with sulfuric acid sludge, for example 20 to 80 volumes of $H_2S$ at standard conditions per volume of sludge per hour, the $H_2S$ supplied to the process is completely converted into elemental sulfur and $SO_2$, as long as the concentration of sulfuric acid in the sludge is sufficiently high, for example above about 75 weight percent. As subsequently shown in connection with Figure 2, the extent of conversion of $H_2S$ when substantially pure aqueous sulfuric acid is employed, is substantially less than when sulfuric acid sludge is employed, indicating that there are materials in the sulfuric acid sludge which catalyze the conversion.

$SO_2$ which is formed in the reaction between $H_2S$ and $H_2SO_4$, may further react with $H_2$ present in the conversion zone, to form elemental sulfur in addition to that formed in the initial reaction. The two reactions thus involved are as follows:

$$H_2 + H_2SO_4 \rightarrow S + SO_2 + 2H_2O$$
$$SO_2 + 2H_2S \rightarrow 3S + 2H_2O$$

When the sulfuric acid concentration is relatively high in the conversion zone, and the $H_2S$ charged is substantially completely consumed in the first reaction, the effluent gases from the conversion zone contain $SO_2$. The $SO_2$ in the effluent gases can be reacted if desired with additional $H_2S$ to form additional elemental sulfur. Alternatively, the $SO_2$ can be converted to $SO_3$ and ultimately to sulfuric acid by known methods.

When the sulfuric acid concentration is relatively low, and the $H_2S$ charged is not completely consumed in the reaction with $H_2SO_4$, the $SO_2$ formed is substantially completely converted to elemental sulfur in the conversion zone by reaction with excess $H_2S$, and the effluent gases from the conversion zone contain $H_2S$ but are substantially free of $SO_2$. In such cases, the effluent gases containing $H_2S$ are preferably recycled to the conversion zone.

In a preferred embodiment of the invention, the process is performed in continuous fashion, with the sulfuric acid in the conversion zone being maintained at a relatively low concentration, e. g. about 70 weight percent. In order to maintain the desired concentration, sulfuric acid sludge having relatively high concentration, e. g. 85 to 90%, is introduced into the conversion zone periodically or continuously, and relatively low concentration sludge is withdrawn from the conversion zone either periodically or continuously. The effluent gases contain $H_2S$ but are substantially free of $SO_2$, and are recycled to the conversion zone. Such recycling of $H_2S$ permits conversion of more of the $H_2SO_4$ contained in the sludge than can be obtained under similar conditions in the absence of such recycling.

The invention can also be carried out according to batch technique, beginning with sludge having concentration of about 85 to 90% for example. In the early stages of the process, the effluent gases contain $SO_2$ but are substantially free of $H_2S$, whereas in the later stages the effluent gases contain $H_2S$ but are substantially free of $SO_2$.

Figure 2:
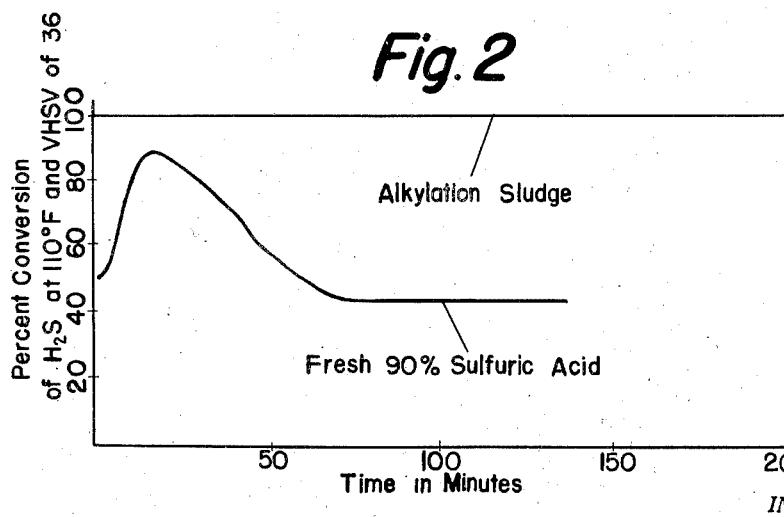

The invention will be further described with reference to the attached drawing, in which Figure 1 is a schematic flowsheet illustrating embodiments of the invention, and Figure 2 is a graph illustrating the process of the invention as compared with the contacting of $H_2S$ with substantially pure aqueous sulfuric acid.

Referring to Figure 1, sulfuric acid sludge comprising $H_2SO_4$, in 75 to 90% concentration for example, and carbonaceous material is introduced into sludge treating zone 10 through line 11, and is contacted therein with $H_2S$ introduced through line 12. The contacting is performed in continuous manner, with sludge having relatively low concentration, e. g. about 70%, being withdrawn, periodically or continuously, through line 13. The sludge treating zone 10 is preferably equipped with agitating means, in order to keep elemental sulfur suspended in the sludge. The average concentration of the sludge in zone 10 is about 70%, and the effluent gases contain $H_2S$, but are substantially free of $SO_2$. The effluent gases are removed through line 14 and recycled to line 12 through line 15.

The sludge withdrawn through line 13 is introduced through sulfur extraction zone 16, wherein it is contacted with a solvent for sulfur introduced through lines 17 and 18. The temperature is sufficiently high, e. g. about 200° F., to provide satisfactory solution of sulfur in the solvent. The solvent phase containing dissolved sulfur is separated from the sludge and introduced through line 19 into sulfur recovery zone 20, the sludge being removed through line 21. In zone 20, sulfur is precipitated from the solution, e. g. by cooling to room temperature, and removed through line 21, the solvent being decanted and recycled through line 22.

In another embodiment of the process according to the invention, the process can be carried out according to batch technique, the treated sludge being removed from zone 10 through line 13 only at the end of the contacting operation, rather than periodically or continuously. In the early stages of the operation, the concentration of sulfuric acid in the sludge is relatively high, and the effluent gases contain $SO_2$ but are substantially free of $H_2S$. The effluent gases can be removed through line 30 if desired, or alternatively can be passed through line 32 into treating zone 33 wherein the sulfur dioxide from the sludge treating zone and hydrogen sulfide from line 34 are reacted to form elemental sulfur. This reaction occurs satisfactorily at room temperature, though higher temperatures can be employed if desired. The reaction can be performed in the presence of water, or according to any of the other known processes for reaction of hydrogen sulfide and sulfur dioxide to form elemental sulfur. Effluent gases if any can be withdrawn through line 35 and recycled to zone 33 if desired. Sulfur formed at zone 33 is withdrawn through line 36, and can be subjected to sulfur refining operations as well known in the art.

In later stages of operation, when the sulfuric acid content has decreased to below 75% for example, the effluent gases from zone 10 contain $H_2S$ but substantially no $SO_2$, and can be recycled through lines 14 and 15, in the manner previously described.

The following example illustrates the invention:

A batch process conforming generally to that described with reference to Figure 1 was carried out, the initial temperature in zone 10 being about 85° F., and the temperature rising to about 150° F. during the course of the contacting. The sulfuric acid sludge was an alkylation sludge initially containing about 89 weight percent of sulfuric acid, and having carbon content corresponding to a hydrocarbon sulfonates content of 11.2 weight percent, assuming such hydrocarbon sulfonates to have the average formula $C_8H_{16}SO_3H$. 100 cc. of the sludge were employed, weighing 174.5 grams. The pressure in the contacting zone 10 was within the range from 250 to 500 mm. of Hg gauge. The vapor hourly space velocity during the first 245 minutes was 24 volumes of $H_2S$ per volume of sludge per hour, and the space rate during the next 205 minutes was 40 volumes per volume per hour. The total contacting time was 8 hours, during which a calculated 1.2 moles of $H_2S$ were charged. 23 grams of sulfur were recovered from the sludge in zone 10, and an additional 27 grams of sulfur were recovered from the treating zone 33 wherein the effluent gases and $H_2S$ were reacted in the presence of water. The total recovery of 50 grams corresponded to a calculated sulfur yield of 51 grams. The final concentration of the sludge was 75.5 weight percent sulfuric acid and 4.1 weight percent hydrocarbon sulfonates, the remainder being primarily water. During the 8 hour period, the $H_2S$ charged was completely converted, so that the effluent gases from zone 10 contained no $H_2S$.

Referring now to Figure 2, results obtained according to the process of the invention are shown in comparison with results obtained in similar operation employing fresh 90% sulfuric acid; both runs were made at 110° F. and vapor hourly space velocity of 36, the conditions being generally similar to those described in the preceding example. The percent conversion of $H_2S$ is plotted against time, and it is readily seen that the substantially pure 90% sulfuric acid provides much poorer conversion of $H_2S$ than the alkylation sludge which is treated according to the process of the invention.

Although the invention has been described previously in connection with the treatment of alkylation sludge, it is to be understood that other sulfuric acid sludges, produced in any of various known processes, can also be satisfactorily treated according to the invention. The petroleum refinery processes for treatment of hydrocarbons with sulfuric acid generally produce sludges which contain materials promoting the reaction of $H_2S$ with $H_2SO_4$ under the conditions of the present process.

In the process of the invention, elevated temperatures and pressures permit greater conversion of $H_2SO_4$ while still obtaining $SO_2$ in the effluent gases from the conversion zone. Thus, in a batch process, the $H_2SO_4$ concentration at which the effluent gases cease to contain $SO_2$ may be about 75% when the conversion zone is at 1 to 2 atmospheres pressure and the temperature is 40° F. to 150° F. for example, and may be substantially lower when the conversion zone is at substantially higher pressure or temperature. And, in a continuous process in which the $H_2SO_4$ concentration is maintained at 70%, the effluent gases contain $H_2S$ but not $SO_2$ if the conversion zone is maintained at 1 to 2 atmospheres pressure and 40 to 150° F. for example, and contain $SO_2$ but not $H_2S$ if the conversion zone is maintained at sufficiently higher pressure or temperature. In the light of the present specification, a person skilled in the art can select proper pressures and $H_2SO_4$ concentrations to produce the desired results.

In continuous processes, where the effluent gases contain $H_2S$ but no $SO_2$, preferred $H_2SO_4$ concentrations are within the approximate range from 50 to 75 weight percent. Where the effluent gases contain $SO_2$ but not $H_2S$, preferred $H_2SO_4$ concentrations are within the approximate range from 65 to 90 weight percent; at the lower $H_2SO_4$ concentrations within this range, relatively high pressures and/or temperatures are needed to provide the desired effluent gas composition.

The invention claimed is:

1. Process for treating sulfuric acid sludge which comprises contacting sludge produced in sulfuric acid treatment of petroleum hydrocarbons with added hydrogen sulfide at a temperature within the approximate range from 40° F. to 250° F., thereby forming elemental sulfur, and separating elemental sulfur from the sludge.

2. Process for treating sulfuric acid sludge which comprises contacting sludge produced in sulfuric acid treatment of petroleum hydrocarbons, which sludge has concentration of $H_2SO_4$ within the approximate range from 50 to 75 weight percent, with added hydrogen sulfide in a conversion zone at a temperature within the approximate range from 40° F. to 250° F., thereby to form elemental sulfur; introducing sludge having sulfuric acid concentration higher than the first-named concentration into the conversion zone in order to maintain the first-named concentration; withdrawing sludge from the conversion zone; withdrawing gases containing hydrogen sulfide from the conversion zone; recycling the withdrawn gases to the conversion zone; and separating elemental sulfur from the sludge.

3. Process for treating sulfuric acid sludge which comprises: contacting sludge produced in sulfuric acid treatment of petroleum hydrocarbons, which sludge has concentration of $H_2SO_4$ within the approximate range from 65 to 90 weight percent, with added hydrogen sulfide in a conversion zone at a temperature within the approximate range from 40° F. to 250° F., thereby to form elemental sulfur; introducing sludge having sulfuric acid concentration which is higher than the first-named concentration into the conversion zone in order to maintain the first-named concentration; withdrawing sludge from the conversion zone; withdrawing gases containing sulfur dioxide from the conversion zone; and contacting the withdrawn gases with hydrogen sulfide in a second conversion zone, thereby to form elemental sulfur.

4. Process for treating sulfuric acid sludge which comprises contacting sludge produced in sulfuric acid treatment of petroleum hydrocarbons with added hydrogen sulfide in a conversion zone at a temperature within the approximate range from 40° F. to 250° F.; withdrawing from the conversion zone gases containing sulfur dioxide; continuing the conversion until the effluent gases contain hydrogen sulfide and are substantially free of sulfur dioxide; recycling such effluent gases containing hydrogen sulfide to the conversion zone; and recovering elemental sulfur from the sludge.

5. Process according to claim 4 wherein said sulfur dioxide is contacted with additional hydrogen sulfide to form elemental sulfur.

6. Process for treating sulfuric acid sludge which comprises contacting sludge produced in sulfuric acid treatment of petroleum hydrocarbons, which sludge has concentration of $H_2SO_4$ within the approximate range from 75 weight percent to 90 weight percent, with added hydrogen sulfide in a conversion zone at a temperature within the approximate range from 40° F. to 250° F., thereby to form elemental sulfur and reduce the concentration of $H_2SO_4$ in the sludge to a concentration within the approximate range from 50 to 75 weight percent; contacting the resulting sludge with hydrogen sulfide in a conversion zone at a temperature higher than the first-named temperature, thereby to form elemental sulfur; and separating elemental sulfur from the sludge.

References Cited in the file of this patent

UNITED STATES PATENTS

| | | |
|---|---|---|
| 1,057,395 | Robinson | Mar. 25, 1913 |
| 1,953,225 | Hechenbeikner | Apr. 3, 1934 |
| 2,153,337 | Oliver | Apr. 4, 1939 |
| 2,737,450 | Morningstar | Mar. 6, 1956 |